US012798469B2

(12) United States Patent
Blonquist

(10) Patent No.: US 12,798,469 B2
(45) Date of Patent: Nov. 17, 2026

(54) CARGO SECUREMENT SYSTEM APPARATUS AND METHODS OF USE

(71) Applicant: Brody Blonquist, Oakley, UT (US)

(72) Inventor: Brody Blonquist, Oakley, UT (US)

( * ) Notice: Subject to any disclaimer, the term of this patent is extended or adjusted under 35 U.S.C. 154(b) by 231 days.

(21) Appl. No.: 18/679,272

(22) Filed: May 30, 2024

(65) Prior Publication Data

US 2025/0145078 A1 May 8, 2025

Related U.S. Application Data

(60) Provisional application No. 63/595,680, filed on Nov. 2, 2023.

(51) Int. Cl.

*B60P 7/08* (2006.01)
*B60R 9/06* (2006.01)
*B62D 33/027* (2006.01)

(52) U.S. Cl.

CPC ............... *B60P 7/0807* (2013.01); *B60R 9/06* (2013.01); *B62D 33/0273* (2013.01)

(58) Field of Classification Search

CPC ....... B60P 7/0807; B60P 7/0815; B60P 3/073; B60P 7/08; B60P 3/075; B60R 9/06; B60R 9/00; B60R 9/048; B60R 11/00; B60R 9/10; B62D 33/0273; B61D 45/001; B61D 45/00

USPC .......................................................... 410/101

See application file for complete search history.

(56) References Cited

U.S. PATENT DOCUMENTS

| | | | | |
|---|---|---|---|---|
| 4,028,916 | A | 6/1977 | Pender | |
| 4,044,577 | A | 8/1977 | Horlacher | |
| 4,964,771 | A * | 10/1990 | Callihan | B60R 7/02 410/96 |
| 4,970,882 | A | 11/1990 | Arrendondo | |
| 5,417,540 | A | 5/1995 | Cox | |
| 5,444,897 | A * | 8/1995 | Gross | B60P 7/0807 24/265 CD |
| 5,598,727 | A | 2/1997 | White | |
| 5,823,725 | A * | 10/1998 | Goodwin | B60R 25/00 410/102 |
| 6,138,975 | A * | 10/2000 | McDaid | B61D 45/001 248/499 |
| 6,312,034 | B1 | 11/2001 | Coleman, II et al. | |
| D451,368 | S | 12/2001 | Hardesty | |
| 6,539,759 | B2 | 4/2003 | Pershall | |
| 8,028,551 | B2 * | 10/2011 | Kalous | E05B 67/24 70/52 |
| 8,773,267 | B2 | 7/2014 | Conti et al. | |
| 8,807,625 | B2 | 8/2014 | Garska | |
| 8,854,207 | B2 | 10/2014 | Williams | |
| 9,260,885 | B2 | 2/2016 | Asquith et al. | |

(Continued)

*Primary Examiner* — Amy R Weisberg
*Assistant Examiner* — Philip C Adams
(74) *Attorney, Agent, or Firm* — Bateman IP; Randall B. Bateman

(57) ABSTRACT

A system for securing a cargo using at least two anchors and at least one cable. An anchor assembly may include a lock head that may be positioned in a stowed position or an engaged position. In the stowed position, an anchor assembly may be described as having a low-profile side-view, as the lock head of the anchor may be disposed within the anchor when not in use. The cable may include a lock stem that is capable of being locked to the anchor and may be of any suitable material for securing the desired cargo or items.

19 Claims, 13 Drawing Sheets

(56) References Cited

U.S. PATENT DOCUMENTS

| | | | |
|---|---|---|---|
| 9,512,649 | B2 | 12/2016 | Mohamed |
| 9,650,085 | B2 | 5/2017 | Wilson |
| 9,758,203 | B2 | 9/2017 | Oviatt |
| 9,827,916 | B1 | 11/2017 | Singer |
| 10,053,889 | B1 | 8/2018 | Maratos |
| 10,086,684 | B1 | 10/2018 | Stamm, Jr. |
| 10,184,271 | B2 | 1/2019 | Perrenoud et al. |
| 10,603,993 | B2 | 3/2020 | Ford |
| 11,124,247 | B2 | 9/2021 | Sosnowich et al. |
| 11,377,160 | B2 | 7/2022 | Leitner |
| 2021/0138954 | A1 | 5/2021 | Beenen |

* cited by examiner

CARGO SECUREMENT SYSTEM APPARATUS AND METHODS OF USE

CROSS-REFERENCE TO RELATED APPLICATIONS

This application claims the benefit of U.S. Provisional Patent Application Ser. No. 63/595,680, filed on Nov. 2, 2023, which is hereby incorporated by reference in its entirety.

THE FIELD OF THE INVENTION

This invention relates to a system for securing a cargo in a truck bed or on a tailgate, and more particularly, a system of anchors and cables that can be used together to secure one item or multiple items of cargo in or around a truck bed or similar structure.

BACKGROUND OF THE INVENTION

Multiple types of systems have been developed and used to secure cargo in a truck bed. Some systems may be described as relatively simple. For example, rope tied around cargo and to the truck bed, or chains may be used in a similar manner. Also, a cover over the cargo and secured to the truck bed may be preferable in some situations. Adjustable straps may also be used to secure cargo of various types. Elastic cords with hooks may be used singularly or in a series of such cords. Other such systems may be comprised of a combination of these.

These systems may be described as having certain advantages and certain drawbacks. Most can require repeated entrance to or access to the cargo area in question. Sometimes, the points of securement for such a system are not easily accessible, or the securement mechanism can be obscured or difficult to access.

Another system that may be used to secure cargo in a truck bed is a retractable cover. Many such covers can be semi-permanently attached to the truck bed. While they may be lockable and offer a relatively secure way to contain cargo, they are usually inflexible. To be secure, the cover has to be firmly attached at all points. Also, any items to be secured must be contained within the truck bed and under the cover.

It would be an advance in the art to have a cargo securement system that can be accessed and operated easily from the ground and can enable multiple anchoring and/or locking positions. It would also be an advance in the art to have an anchoring system that is easily customizable and adaptable to various cargo or storage situations. It would also be an advance in the art to have an anchoring system that enables securing a wide variety of items.

SUMMARY OF THE INVENTION

The system may be described as comprising at least two anchors and at least one cable connector, cord, or rack. The system may configured in multiple ways depending on the intended use and/or cargo to be secured.

Each anchor or device may include a stowed configuration and a functional, engaged configuration. Each anchor may include a pop-up design such that a head or post is extended when in use, or in an engaged configuration. Each anchor may include a pop-up design such that the anchor is low profile when not in use, or in a stowed configuration. Each anchor may include a pop-up design that allows the lock head to be toggled between a stowed position and an engaged position. Each anchor may provide a locking mechanism, which locking mechanism may be controlled or locked by a key, a combination lock, or the like. Each anchor may provide a port, or access point, where one end of a cable may be inserted into and secured to the lock head of the anchor.

A cable or cord may be of any suitable material. A cable or cord may have an insert or head at one or more ends, wherein the head is shaped to fit into the lock head of the anchor in some manner that allows the end of the cable to be secured by the anchor. A cable or cord may be comprised of a flexible material, a stretchable material, a bendable material, or any similar material suitable for securing a cargo by use of this system.

The invention relates to a system for securing a cargo to a cargo area or a container of some sort. In one embodiment, at least two anchors and a cable are used to secure an item to the tailgate of a truck. For example and not by way of limitation, the system may be used to secure a cargo of one or more items within a truck bed. The system may be used to secure one or more items to the tailgate of a truck.

A cargo may be comprised of one or more items. A cargo may be comprised of a variety of similar or disparate items. For example and not by way of limitation, items associated with a cargo may be comprised of a motorcycle, a bicycle, an ice chest, a camping chair, a generator, or virtually any item that includes a way to thread a cable through the item.

In one embodiment, the system includes anchor devices that can be installed in the tops of the sides of truck bed. The anchor may be easy to install and/or uninstall. The anchor provides a means, such as a lock head, to insert one end of a cable into the lock head and lock that end of the cable into the lock head of the anchor. Then the cable can be threaded through bikes, or wrapped around other items, and the other end of the cable can be locked into the other anchor. In this manner, items in the truck bed, or bikes hanging from or near the tailgate, or items on the ground by the truck, can be secured with the cable that is locked to two or more anchors. It is a system for securing and/or locking items in or near the bed of a truck. The system/anchors may be used in other settings. Multiple anchors could be used to provide other securement, i.e., four anchors could be used at the corners of a truck bed to secure a "web" of cable over the bed of a truck.

In one embodiment, anchors may be designed to have a low profile as compared to the top of the sides of the truck bed. The lock component of the anchor is designed to extend upwards during use/locking and be retracted (inserted) inside the anchor during non-use. This extension/retraction may be accomplished using a spring with a cable or a rod to support the lock component. In one embodiment, an anchor may include a rubber cap, or top cover, to keep out road grime, mud, salt, etc.

In one embodiment, an apparatus may comprise a body operably containing a lock head and operably containing a button head screw, wherein the lock head comprises a lock port, a locking mechanism and a cable core, and wherein the button head screw is operably connected to an expansion fastener. The lock head of the apparatus may be capable of being in one of a stowed position and an engaged position. While in an engaged position, the lock head may be rotatable. The locking mechanism in the lock head may be a combination lock, or the locking mechanism may use a key. The cable core may further comprise a core sheath. The apparatus may further comprise a top cover that is removably connectable to the body.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE INVENTION

Figure 1:
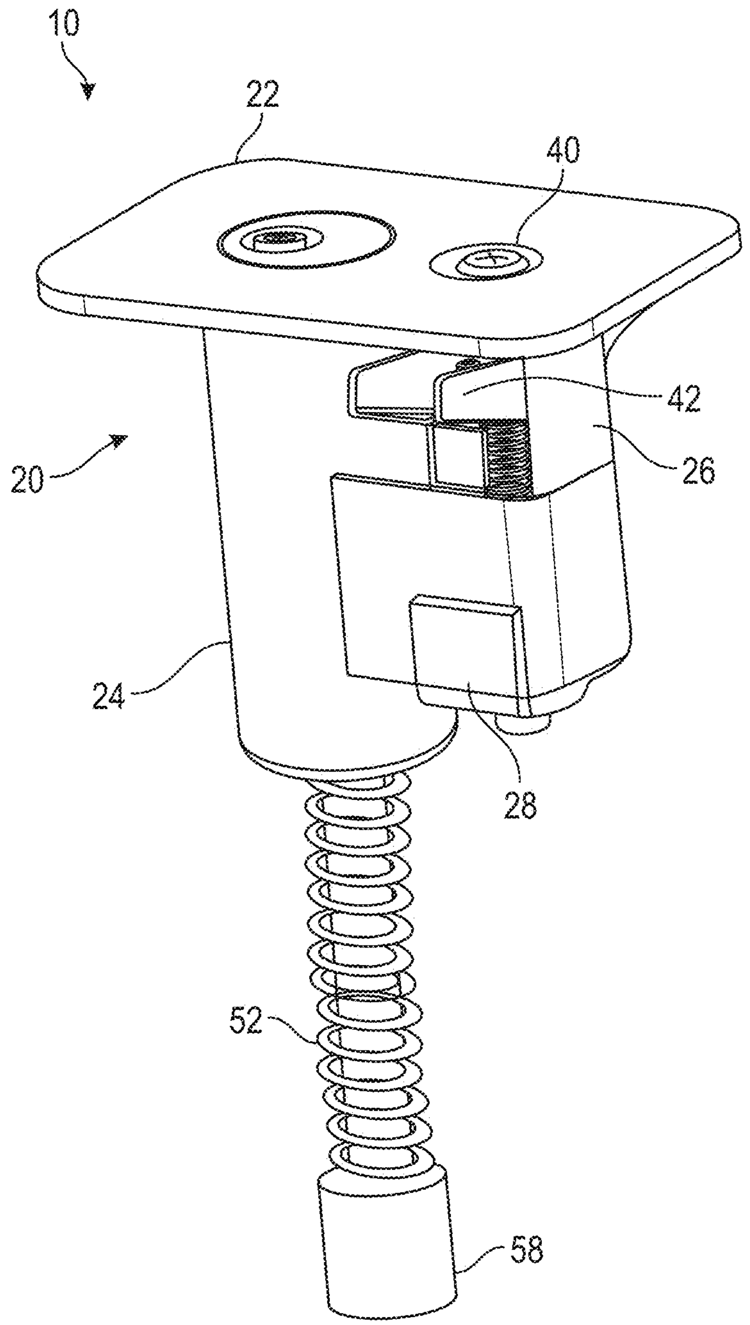
FIG. 1 is an upper, perspective view of an anchoring device.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of systems and methods in accordance with the invention. The illustrated embodiments will be best understood by reference to the drawings, wherein like parts are designated by like numerals throughout.

Referring to FIG. 1, and generally to FIGS. 1-4, an anchor 10, or anchor assembly 10, is shown. An anchor 10 may be generally comprised of multiple components, including for example, a body 20, a lock head 30, a button head screw 50, and associated component members.

A body 20, may be generally comprised of a top plate 22, a tube 24, a lock bracket 26, and an end bracket 28. The components of the body 20 may be comprised of any suitable material, such as stainless steel, alloy steel, titanium alloy, aluminum alloy, various polymers, or the like. Generally, the body 20 houses and connects the other components of the anchor 10. The body 20 provides a base or foundation for the anchor assembly 10.

A top plate 22 may be essentially flat or planar. The top plate 22 may be rectangular with rounded corners, although other shapes may be possible and acceptable. The top plate 22 may include one or more holes or apertures for allowing positioning of and access to a lock head 30 and/or a button head screw 40. The top plate 22 may have a length of approximately 3.38 inches (approximately 8.5 cm), a height of approximately 2.25 inches (approximately 5.7 cm), and a width of approximately 0.06 inches (approximately 1.5 mm). These dimensions may be altered or adjusted depending on a desired use. For example, a top plate 22 may have a width of approximately 0.13 inches (approximately 3.3 mm).

In a top plate 22, the hole for the lock head 30 may have a diameter of from approximately 1 inch (approximately 25.4 mm) to approximately 0.91 inches (approximately 23.1 mm). Any suitable diameter may be used in order to accommodate positioning and use of the lock head 30. In a top plate 22, the hole for the button head screw 40 may have a diameter of approximately 0.28 inches (approximately 7.1 mm). Any suitable diameter may be used in order to accommodate positioning and use of the button head screw 40.

A tube 24, or lock tube 24, may be essentially cylindrical. The tube 24 may have a length of approximately 3.25 inches (approximately 8.25 cm), and have an outside diameter of approximately 1.25 inches (approximately 3.175 cm). The thickness of the cylinder wall of the tube 24 may be approximately 0.083 inches (approximately 2.1 mm). In another embodiment, tube 24 may have a length of approximately 2.68 inches (approximately 6.8 cm), and have an outside diameter of approximately 1.13 inches (approximately 2.87 cm). The thickness of the cylinder wall of the tube 24 may be approximately 0.11 inches (approximately 2.8 mm).

A tube 24 may be connected to a top plate 22 in any suitable manner, such as welding or the like. The tube 24 may be connected to the underside of the top plate 22 so that the cylinder of the tube 24 is concentric with the hole for the lock head 30 and extends essentially perpendicular to the plane of the top plate 22. A tube cap 25 may be connected to the end of the cylinder of tube 24 at the end opposite of where the tube 24 is connected to the top plate 22. The tube cap 25 may be described as having the shape of a washer that functions to close the end of the tube 24 opposite the top plate 22 while allowing a lock core 36 and/or core cover 38 to pass through the hole in the tube cap 25.

A lock bracket 26 may be shaped as a rectangular plane with two arms that extend orthogonally from each side of the plane, where the width of the arms is less than the length of the plane. The lock bracket 26 may begin as a flat piece that is relatively T-shaped. The arms of the lock bracket 26 may be formed by bending the top of the T-shape perpendicular with respect to the rectangular plane. The top of the rectangular plane of the lock bracket 26 is connected to the underside of the top plate 22 and extends perpendicularly from the top plate 22. A suitable portion of the top of the rectangular plane of the lock bracket 26 may be bent at an angle of 90 degrees to facilitate attachment to the underside of the top plate 22. The arms on each side of the lock bracket 26 extend orthogonally from the rectangular plane and toward the tube 24. Each arm of the lock bracket 26 may be connected to the tube 24 proximate the respective sides of the tube 24. Any suitable connections between the lock bracket 26, the top plate 22, and the tube 24 may be used, such as welding or the like. Once connected, there will be a gap between the underside of the top plate 22 and the top of the arms of the lock bracket 26.

An end bracket 28 may be a rectangular piece that is bent into a U-shape. The bottom of the U-shaped end bracket 28 may include a hole that can allow the bottom end of the button head screw 40 to pass through. The sides of the U-shaped end bracket 28 may be connected to the outsides of each arm of the lock bracket 26. Once connected, the hole in the bottom of the U-shaped end bracket 28 will line up with, or be concentric with, the hole for the button head screw 40 in the top plate 22. The end bracket 28 serves to provide a base or solid end for securing the end of the button head screw 40. Thus, a button head screw 40 may be inserted through an appropriate hole in the top plate 22 and through the hole in the bottom of the U-shaped end bracket 28, and then secured in place with a washer 44 and a pin 46, which pin 46 is inserted through a hole in the end of the button head screw 40. The washer 44/pin 46 combination maintains the positioning of the button head screw 40 while still allowing for the rotation of the screw 40.

A lock head 30 may be considered as a single piece comprised of a head 32 or post 32, a lock 34 or locking mechanism 34 within the head 32, and a lock core 36 or cable core 36 extending orthogonally from the head 32. The cable core 36 may include a core cover 38 or core sheath 38. The head 32, or post 32, may include a lock port 35. The lock port 35 may allow the end of a cable 64 to be inserted into the lock port 35 so that the cable 64 can be locked into the head 32 via the lock port 35 and by use of the locking mechanism 34. The locking mechanism 34 may be activated by use of a key, or a combination lock (FIG. 12), or the like.

One example of a lock head 30 and associated cable 64 would be a Bell Sports™ Key Cable Bike Lock, which is commonly used to secure a bicycle. The end of a cable may be locked into the head of the lock. Any suitable, equivalent device may be used and/or modified as described herein.

The overall length of the lock head 30 may be approximately 5.38 inches (approximately 13.67 cm), with the head 32 or post 32 approximately 2.38 inches (approximately 6.05 cm) and the cable core 36 approximately 3.0 inches (approximately 7.62 cm). The lock head 30 may be described as having a proximate end and a distal end. The proximate end of the lock head 30 may be described as the top of the head 32. The distal end of the lock head 30 may be described as the end of the cable core 36.

A lock head 30 may be inserted through an appropriate hole in the top plate 22 and through the hole in the tube cap 25, and then secured in place with a lock cap 58 connected to the distal end of the lock head 30. Generally, a lock head 30 may be described as having two positions: a stowed position, and an engaged position. In a stowed position, the proximate end of the lock head 30, or top of the head 32, is effectively flush with the top surface of the top plate 22 (as shown more particularly in FIG. 1). In an engaged position, the proximate end of the lock head 30, or top of the head 32, is elevated above the top surface of the top plate 22 (as shown more particularly in FIG. 2). The lock head 30 may be configured to be "toggled" between a stowed position and an engaged position. Once in an engaged position, the head 32 may be rotatable, or rotated to adjust the position of the lock port 35 as desired.

Figure 2:
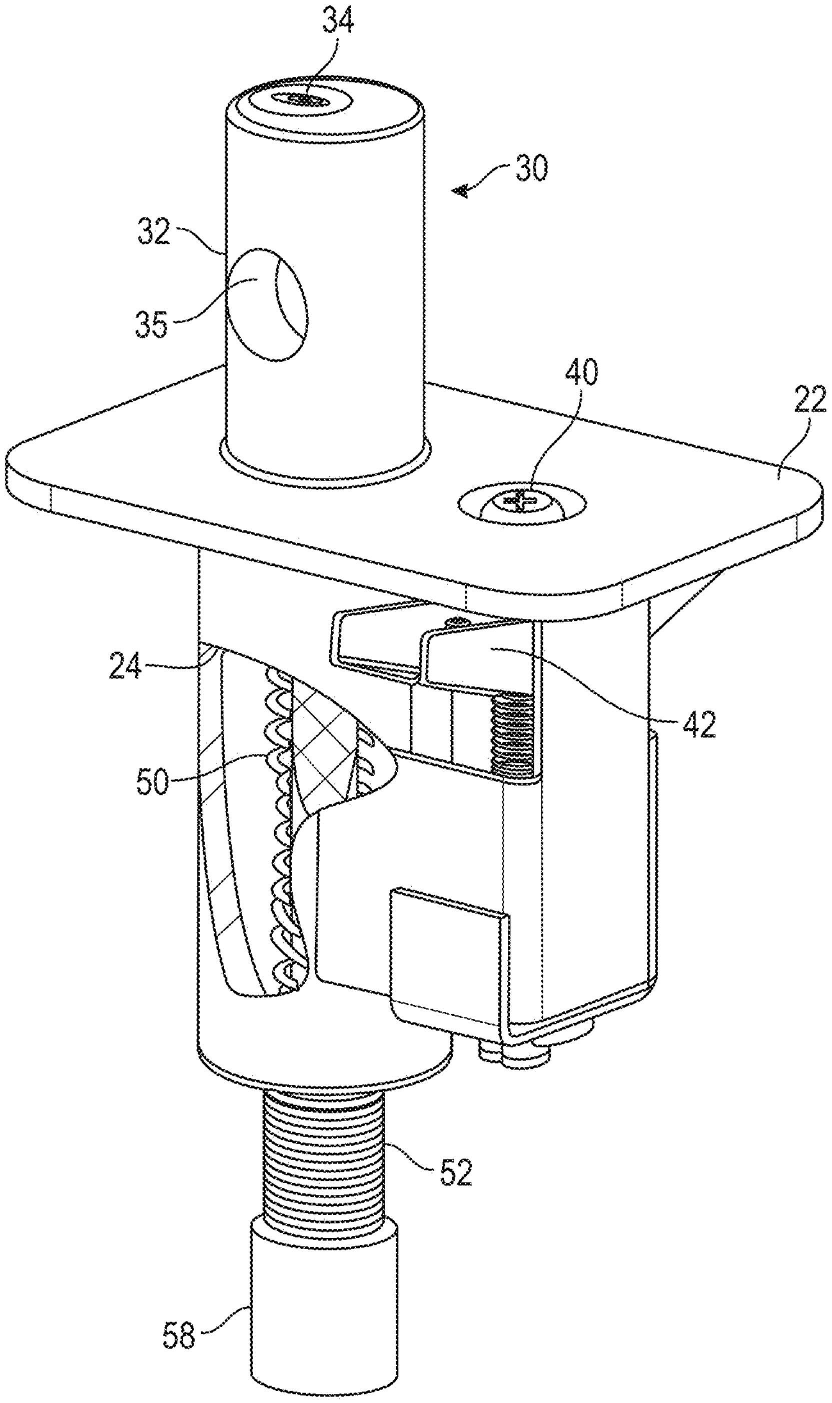
FIG. 2 is an upper, perspective view of an anchoring device with a portion cut-away to show certain internal structures.
Figure 3:
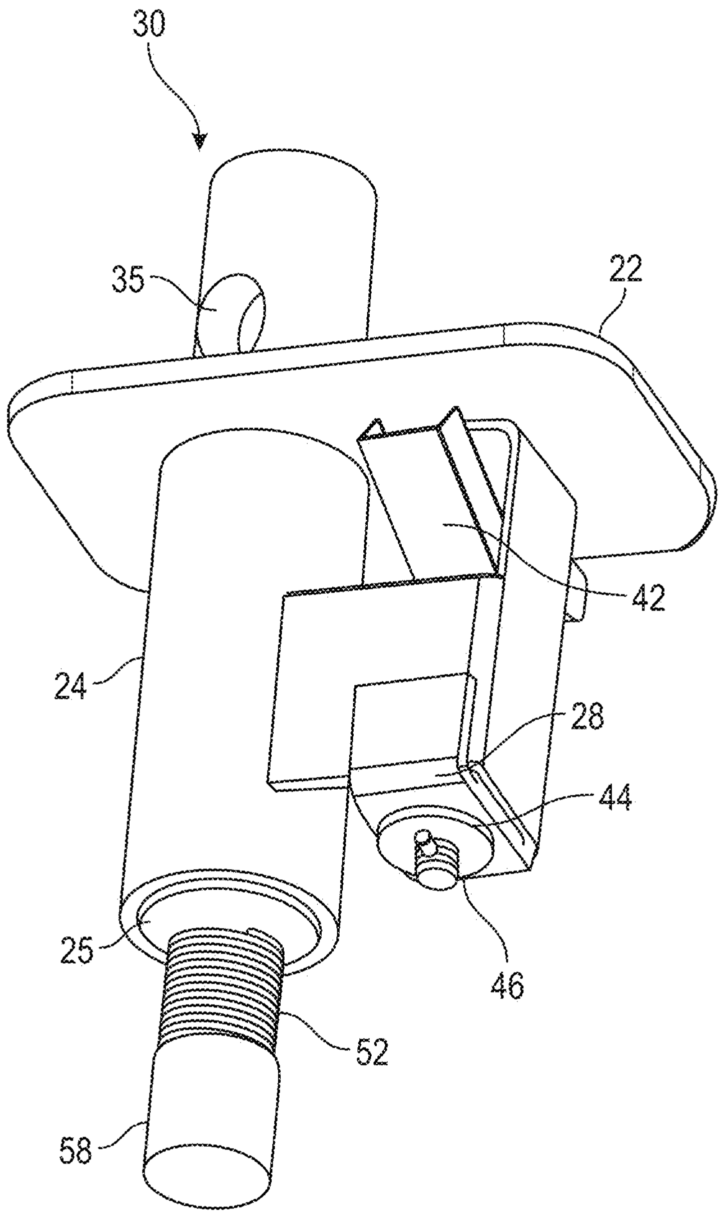
FIG. 3 is a bottom, perspective view of an anchoring device.
Figure 4:
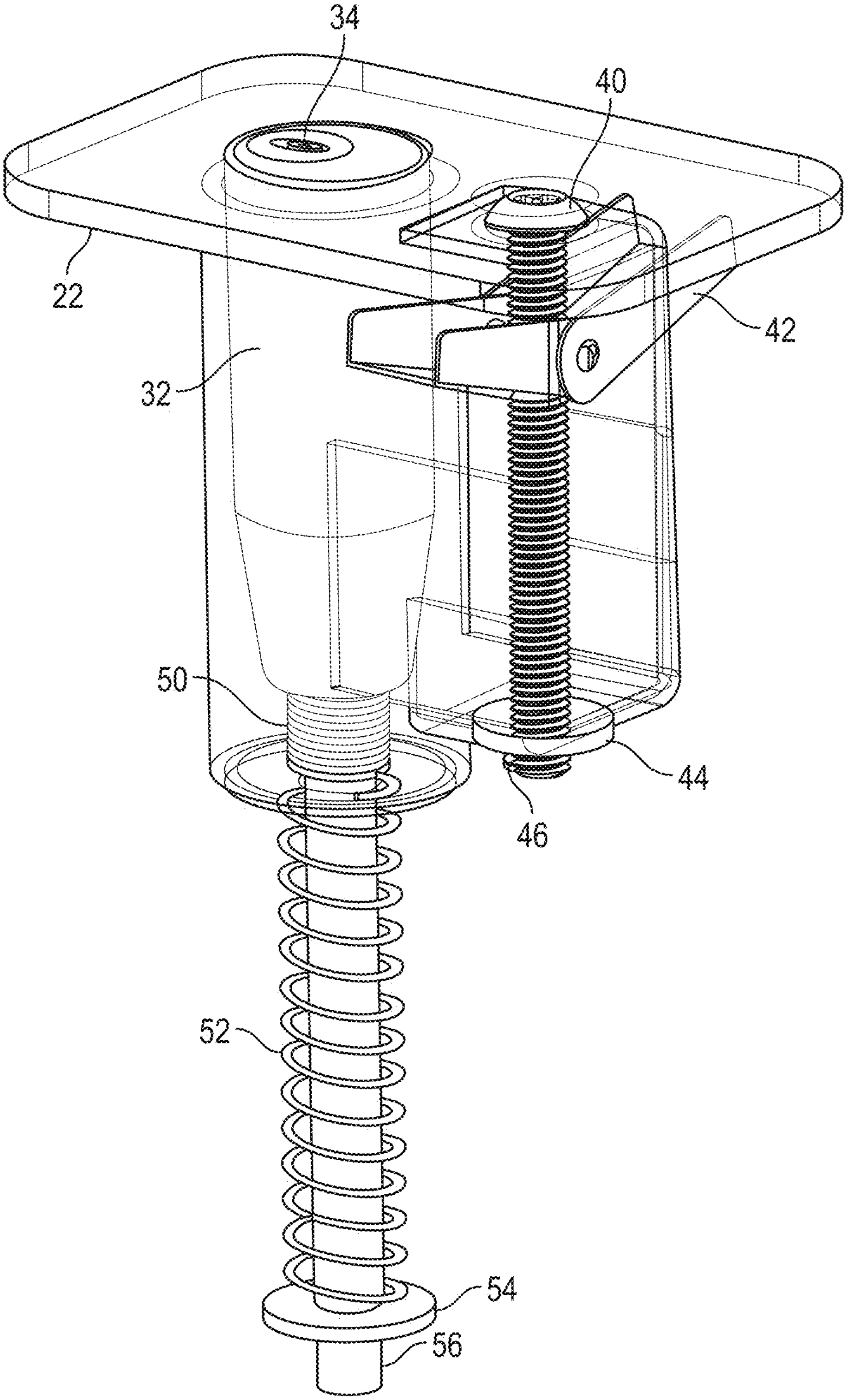
FIG. 4 is a perspective view of an anchoring device with the body portion of the device in ghost appearance to show certain internal structures.

In one embodiment of an anchor 10, an extension spring 50 may be located along the cable core 36 between the head 32 and the tube cap 25, within the tube 24 (as shown more particularly in FIGS. 2 and 4). A retraction spring 52 may be located along the cable core 36 between the tube cap 25 and the lock cap 58 (as shown more particularly in FIGS. 1 and 4).

When the lock head 30 is in the stowed position, the extension spring 50 is compressed and the retraction spring 52 is uncompressed (as shown more particularly in FIG. 4). When the lock head 30 is in the engaged position, the extension spring 50 is uncompressed and the retraction spring 52 is compressed (as shown more particularly in FIG. 2).

In either the stowed or engaged position, the lock head 30 may be locked into that position. When the locking mechanism 34 of the lock head 30 is activated, the head 32 will not move with respect to the cable core 36. Thus, the head 32, or post 32, may be locked into position, either in the stowed or engaged positions.

The button head screw 40 may be counter-sunk so that the button head screw 40 does not extend above the top plate 22. Thus, when the lock head 30 is in the stowed position, the top plate 22 is essentially flat, with no component pieces extending above the surface of the top plate 22.

An expansion fastener 42 may be connected to the button head screw 40 and positioned so that when the button head screw 40 is turned clockwise to tighten the screw 40, and the wings of the expansion fastener 42 expand, they can expand through the gap between the bottom of the top plate 22 and the top of the arms of the lock bracket 26. Thus, the wings of the expansion fastener 42 will expand and move toward the underside of the top plate 22, and secure any structure between the underside of the top plate 22 and the wings of the expansion fastener 42 in a vice-like, but releasable, hold. Similarly, when the button head screw 40 is turned counter-clockwise to loosen the screw 40, and the wings of the expansion fastener 42 retract, they can retract within and between the arms of the lock bracket 26. Thus, the wings of the expansion fastener 42 will move away from the underside of the top plate 22, and release any structure between the underside of the top plate 22 and the wings of the expansion fastener 42. The wings of an expansion fastener 42 may be configured to spring open when not confined within a lock bracket 26.

Figure 5:
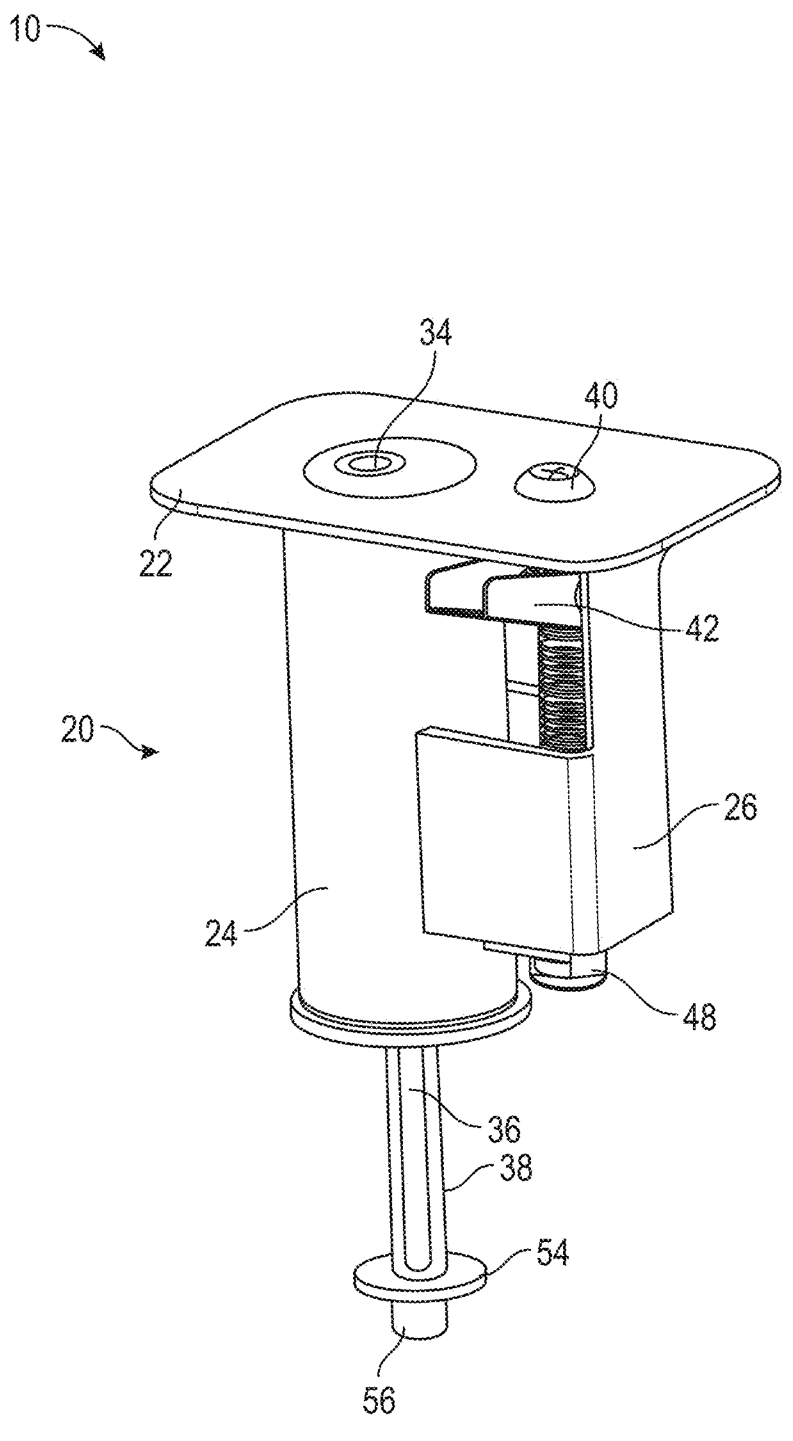
FIG. 5 is an upper, perspective view of an anchoring device.
Figure 6:
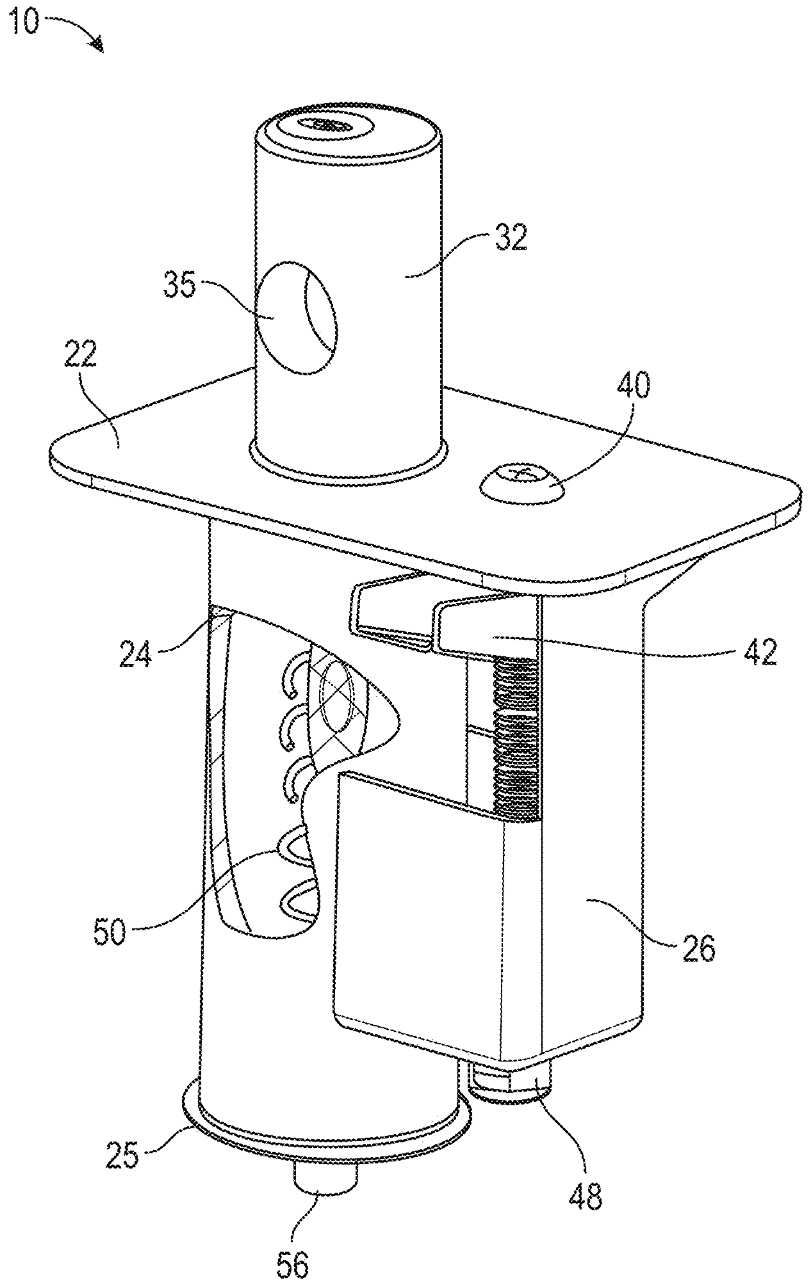
FIG. 6 is an upper, perspective view of an anchoring device with a portion cut-away to show certain internal structures.
Figure 7:
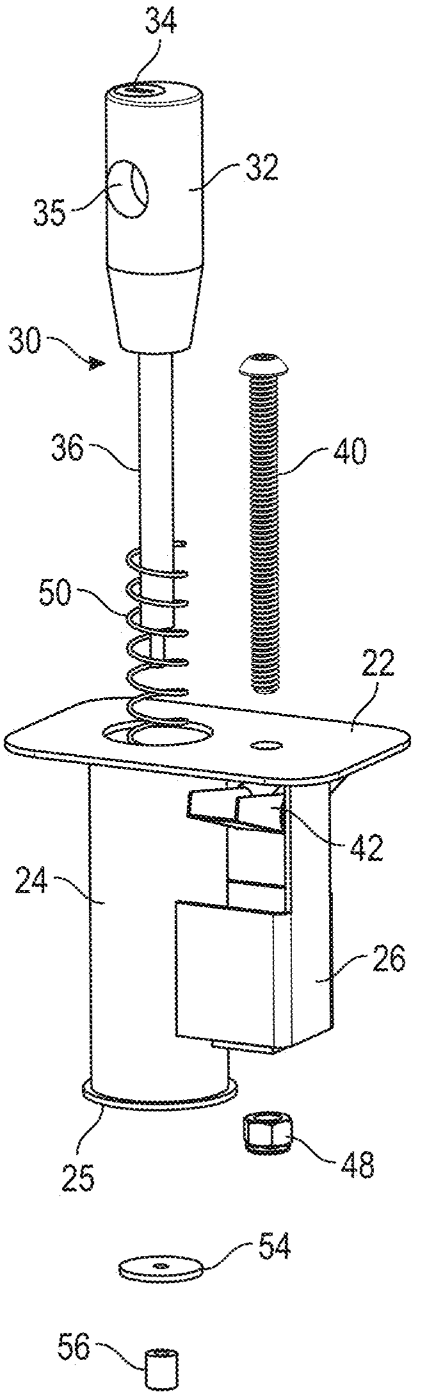
FIG. 7 is an exploded view of an anchoring device.

Referring to FIG. 5, and generally to FIGS. 5-7, an anchor 10, or anchor assembly 10, may have an alternative embodiment. An anchor 10 may comprise a body 20 and a lock head 30 as generally described herein. A cable core 36 may comprise a core cover 38, or a core sheath 38. A core cover 38 may provide additional protection to the cable core 36.

The distal end of the lock head 30, or end of the cable core 36, may include a lock washer 54 and a lock nut 56 connected or fastened to the end of the cable core 36. In the stowed position, the cable core 36 will extend below the tube cap 25 and the extension spring 50 will be compressed within the tube 24. In the engaged position, the head 32 will extend above the top plate 22 and the extension spring 50 will be uncompressed, which configuration will pull the cable core 36 up through the tube 24, but the lock washer 54/lock nut 56 combination will prevent the extension spring 50 from pulling the cable core 36 too far (as shown more particularly in FIG. 6).

The top of the button head screw 40 may sit on the surface of the top plate 22. This may allow easy access to the top of the button head screw 40. The end of the button head screw 40 may be secured in place using an anchor nut 48. The anchor nut 48 maintains the positioning of the button head screw 40 while still allowing for the rotation of the screw 40.

Referring to FIG. 7, the exploded view shows the alignment of the separate component pieces in this particular embodiment of an anchor 10. This particular embodiment utilizes one spring, or extension spring 50. Any suitable spring or bias member may be used. Similarly, functionally equivalent component pieces may be substituted within the anchor 10.

Figure 8:
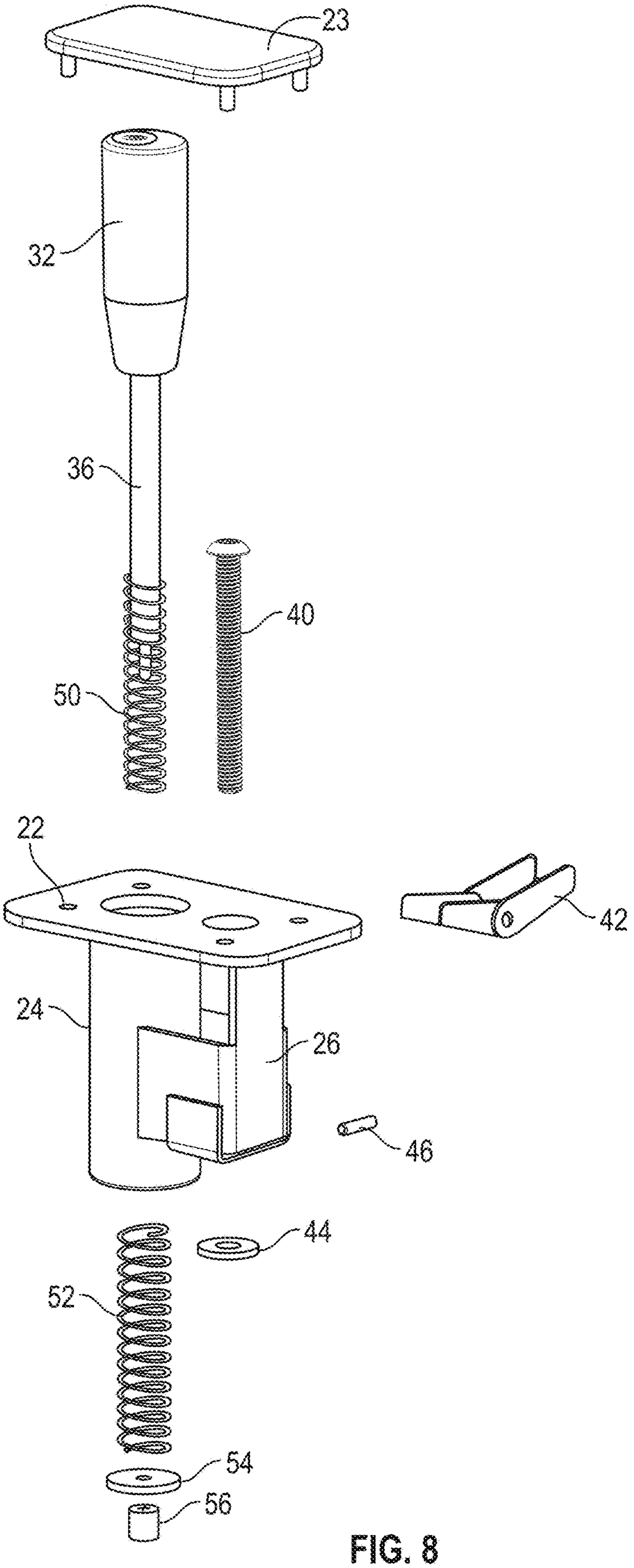
FIG. 8 is an exploded view of an anchoring device.

Referring to FIG. 8, the exploded view shows the alignment of the separate component pieces in this particular embodiment of an anchor 10. This particular embodiment utilizes two opposing springs, with one extension spring 50 and one retraction spring 52. This particular embodiment also shows a plate cover 23, or top cover 23. A top cover 23 may be removably attached to a top plate 22 so as to cover and protect the locking mechanism 34 of the lock head 30 and the top of the button head screw 40. Thus, use of a top cover 23 can prevent rain and/or dirt from damaging or fouling the locking mechanism 34 or the button head screw 40.

Figure 9:
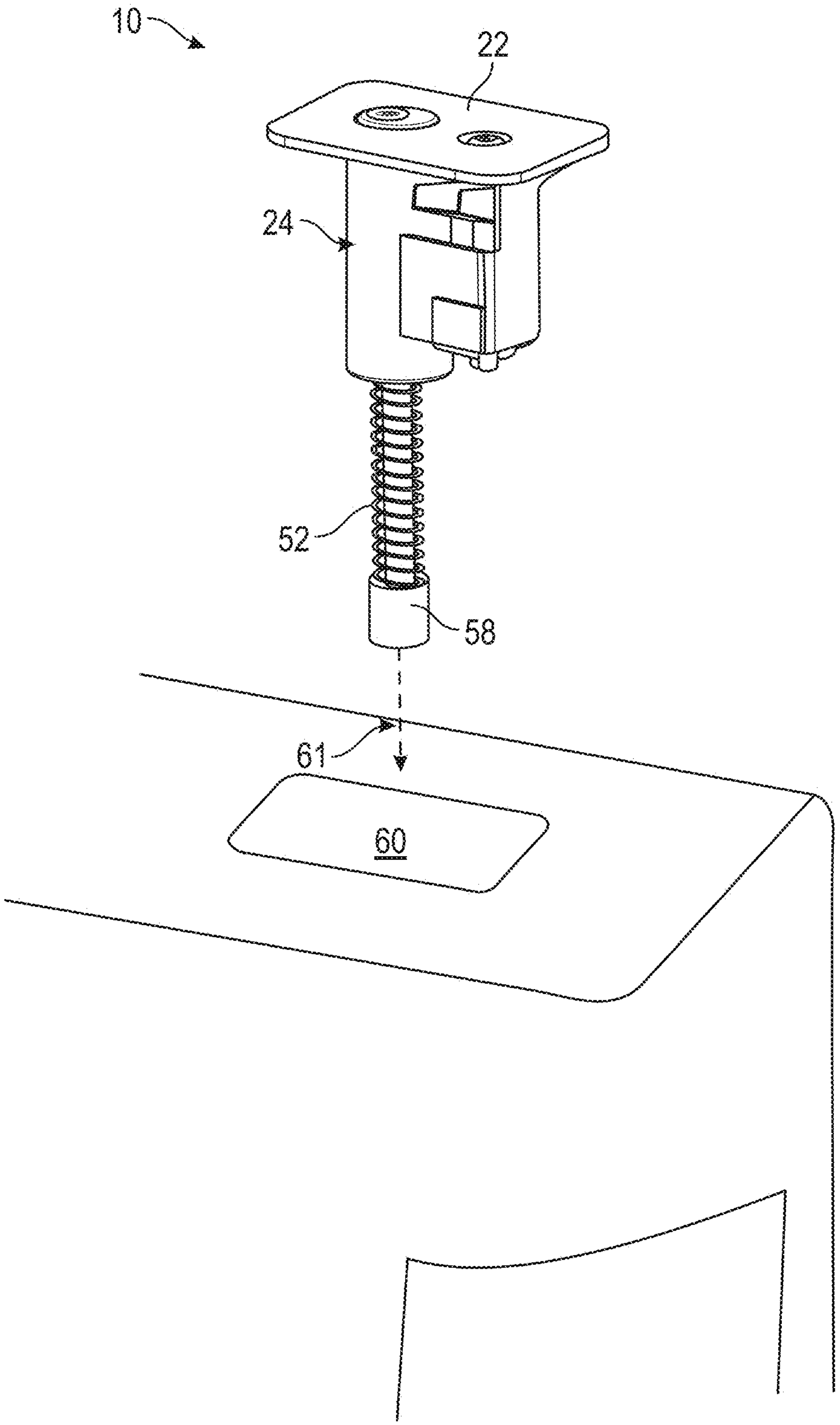
FIG. 9 is a perspective view of use of an anchoring device.

Referring to FIG. 9, an anchor 10 may be inserted into an opening 60, or aperture 60, of a truck bed (commonly called a stake pocket) or any similar structure. An anchor 10 may be inserted into any suitable opening 60 on any suitable structure. Generally, the anchor 10 will be inserted into the opening 60 along the insertion angle 61, which is essentially perpendicular with respect to the anchor 10 and the opening 60. The top plate 22 will have a larger perimeter as compared to the perimeter of the opening 60. Thus, the body 20, lock bracket 26, and the lock head 30 will fit inside the opening 60. The wings of the expansion fastener 42 will be contracted during insertion of the anchor 10. With the top plate 22 resting over the opening 60, the button head screw 40 will be turned clockwise and tightened so that the wings of the expansion fastener 42 will expand as the fastener 42 moves toward the underside of the top plate 22. At some point, the wings of the expansion fastener 42 will contact the underside of the rim of the opening 60, effectively locking the rim of the opening 60 between the expansion fastener 42 and the top plate 22. Thus, the anchor 10 will be locked securely into the opening 60. However, the anchor 10 may be removed from the opening 60 by turning the button head screw 40 counter-clockwise and loosening the expansion fastener 42.

Figure 10:
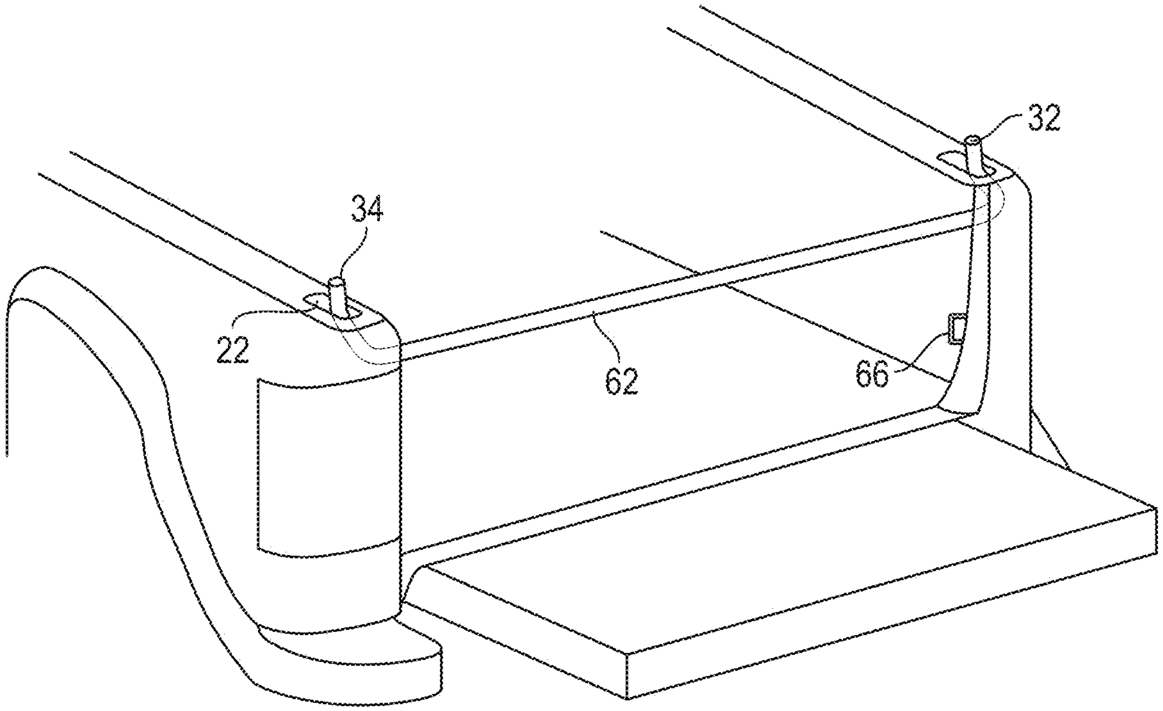
FIG. 10 is a perspective view of an anchoring system.

Once secured into an opening 60, an anchor 10 may be used to secure cargo and/or other items 68 in or near a truck bed. Referring to FIG. 10, a pair of anchors 10 may be secured to opposing sides of a truck bed. Each anchor 10 may place the head 32 of the lock head 30 in the engaged position, extending the heads 32 above the surface of the top plates 22. With the heads 32 extended, a rack 62 may be suitably connected between the heads 32. A rack 62 may be comprised of a stiff, solid piece of metal or plastic. The ends of the rack 62 may be configured to include a lock stem 39 that can be inserted into the lock ports 35 in each head 32. Thus, a rack 62 could be locked into place. A lock stem 39 may be of any suitable shape or configuration that allows for insertion into a lock port 35 and can be locked to the lock head 30. Similarly, the ends of the rack 62 may be configured with hoops that fit over the heads 32. Thus, a rack 62 could be removably connected to the heads 32.

Figure 11:
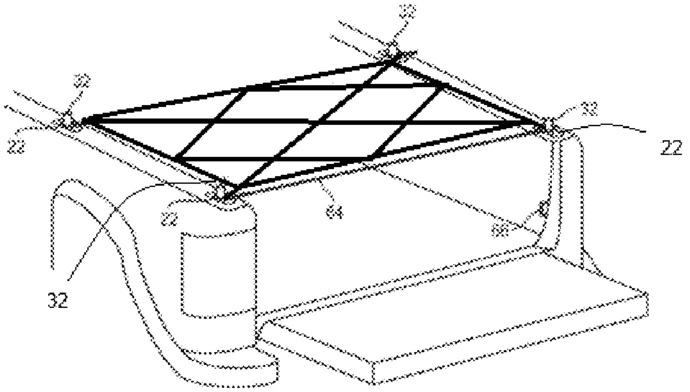
FIG. 11 is a perspective view of an anchoring system.

Referring to FIG. 11, a pair of anchors 10 may be secured to opposing sides of a truck bed. Each anchor 10 may place the head 32 of the lock head 30 in the engaged position, extending the heads 32 above the surface of the top plates 22. With the heads 32 extended, a cable 64, or cord 64, may be suitably connected between the heads 32. The ends of the cable 64 may be configured to include lock stems 39 that can be inserted into the lock ports 35 in each head. Thus, a cable 64 could be locked into place. A lock stem 39 may be of any suitable shape or configuration that allows for insertion into a lock port 35 and can be locked to the lock head 30. Similarly, the ends of the cable 64 may be configured with hooks that fit around the heads 32. Thus, a cable 64 could be removably connected to the heads 32.

Figure 12:
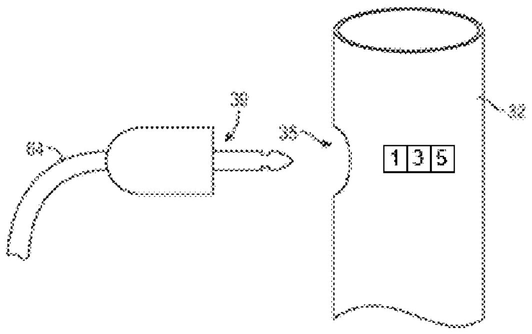
FIG. 12 is a perspective view of one embodiment of a cable that is lockable to an anchor.

Referring to FIG. 12, a cable 64 may include a lock stem 39 at an end of the cable 64. A lock stem 39 may be of any suitable shape or configuration. The lock stem 39 may be inserted into a lock port 35 of a head 32. Thus, the cable 64 is secured to a lock head 30 by securing the lock stem 39 within the lock port 35 in the head 32 of the lock head 30.

Figure 13:
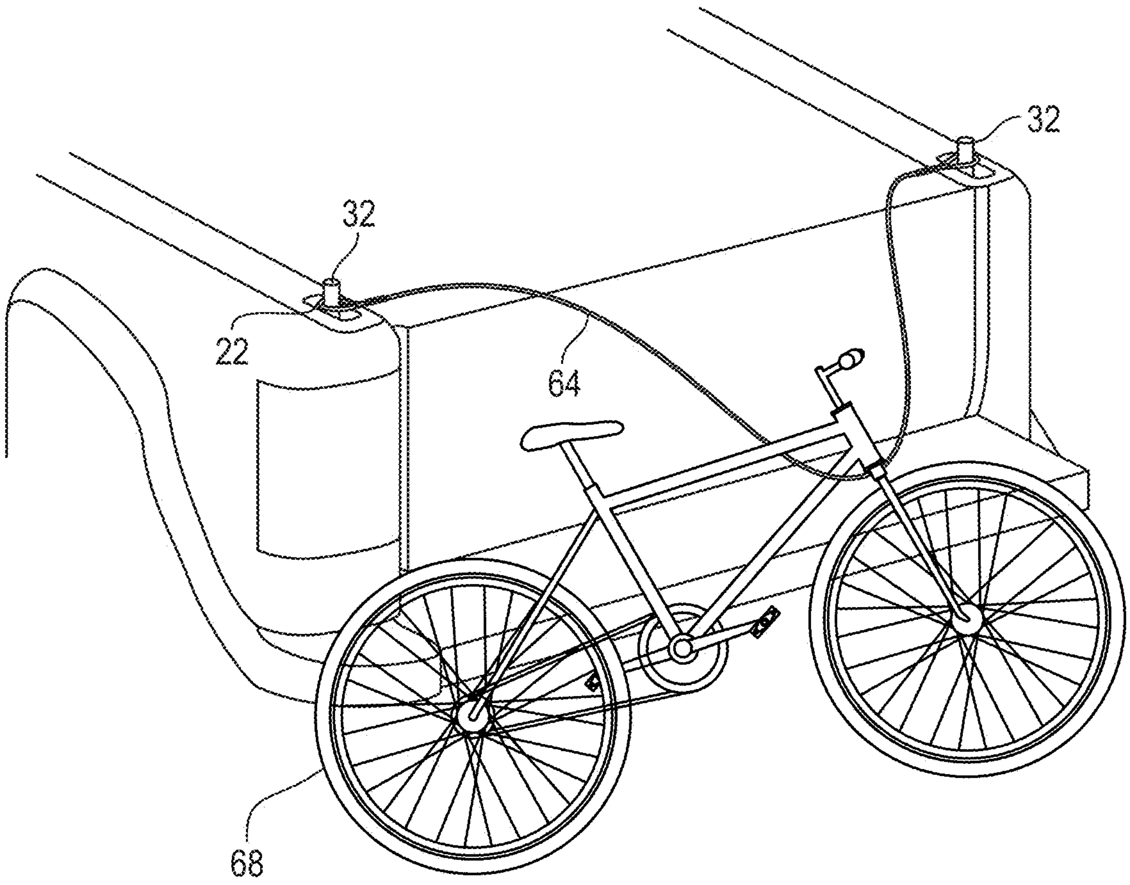
FIG. 13 is a perspective view of one embodiment of a pair of anchors and a cable used to secure an item.

Referring to FIG. 13, a cable 64 may be connected and/or locked to a pair of heads 32 of lock heads 30. One end of a cable 64 may connect or lock to one head 32 of a lock head 30, and then the cable 64 may be threaded through an item 68, or cargo 68, so that the item 68 will be secured when the other end of the cable 64 is connected and/or locked to another head 32 of a lock head 30. For example, a cable 64 may be threaded through the frame of a bike, or through both wheels and the frame of a bike. A cable 64 may be of any suitable length to enable the cable to be threaded through multiple items and/or multiple parts of a single item. Thus, one or more items may be secured using a system of anchors and a cable.

In one embodiment, both ends of a cable 64 will be configured to be inserted into, and locked into, the lock ports 35 in the heads 32 of anchors 10. The cable 64 can be of any suitable length. For example, the cable 64 may have a length that essentially matches the width of the truck bed. Thus, when each end of the cable 64 is locked into place, the cable 64 will be relatively taught. In another example, the cable 64 may have a longer length that allows the cable 64 to be threaded through one or more items, such as bikes, or the handles on ice chests, or the like, before both ends of the cable 64 are locked into place, which items may be located in or near the truck bed. Thus, multiple items may be secured and/or locked in place in or near the truck bed. In another example, the cable 64 may have a longer length that allows the cable 64 to be threaded through one or more connection hooks 66 before both ends of the cable 64 are locked into place, which connection hooks 66 may be found at various points in a truck bed. Thus, when each end of the cable 64 is locked into place, the cable 64 may provide a sort of criss-crossing barrier. In another example, the cable 64 may have a length that is relatively shorter than the width of the truck bed and be comprised of an elastomeric material. Such an elastic cable could be used in a wide variety of truck beds. Thus, when each end of the cable 64 is locked into place, the cable 64 will be relatively taught, albeit stretchable.

One common factor with these different types of cables would be that the ends of the cables are lockable into the lock heads 30 via the lock ports 35. Thus, they would be more secure than other forms of cargo containment. Also, cables can be designed in a variety of configurations. For example, a cable could be configured to include a net-like portion between two or more ends of the cable. Locking the ends of the cables into the lock heads of two or more anchors will enable multiple items to be secured using this system. As another example, a net-like cable configuration could include four ends of cable that are lockable into four anchors, where the anchors are secured at the four corners of a truck bed.

In one embodiment, a method for using an anchor and securing items of cargo may be described in the following steps. Providing a first anchor, wherein the first anchor comprises a first lock head and the first lock head comprises a first lock port. The first anchor may comprise other components, such as a locking mechanism and a button head screw with an expansion fastener, and the first anchor may include other portions of components, such as a head of the lock head. Generally, this step may include providing an anchor that is comprised of various components as described herein and functions essentially and/or effectively as described herein.

Providing a second anchor, wherein the second anchor comprises a second lock head and the second lock head comprises a second lock port. The second anchor may comprise other components, such as a locking mechanism and a button head screw with an expansion fastener, and the second anchor may include other portions of components, such as a head of the lock head. Generally, this step may include providing a second anchor that is comprised of various components as described herein and functions essentially and/or effectively as described herein.

A first anchor and a second anchor may be secured substantially within an opening. Part of using an anchor may be described as inserting the anchor into an opening in a truck bed, or any other structure that has an opening that can accommodate an anchor, and securing the anchor in a manner such that the anchor is substantially within the opening, i.e., the top plate and associated structures may be described as above the opening, but the rest of the anchor may be described as within the opening.

Providing a cable having a proximate end and a distal end, wherein the proximate end comprises a first lock stem that is capable of being inserted into the first lock port and locked to the first lock head, and the distal end comprises a second lock stem that is capable of being inserted into the second lock port and locked to the second lock head. Generally, a cable may be comprised of any suitable material and have any suitable configuration. A cable may include two ends that are both configured with a lock stem that may be inserted into a corresponding lock port, thereby being able to lock the lock stem and accompanying cable to a lock head.

Providing at least one item to be secured may include any item of cargo, or any suitable item, that is intended to be secured using anchors and a cable. Generally, the item may be any item that includes some sort of structure that allows for threading a cable through a structure or component of the item. For example, a cable may be threaded through the frame of a bicycle, or the wheel of a motorcycle, of the frame of a folding chair, or the handle of an ice chest, or the like.

Locking the first lock stem to the first lock head may be described as an initial step in securing one or more items using anchors and a cable. The first end of a cable may be secured to the first lock stem, thus providing the first, secure anchoring point for the cable.

Then, using the cable to secure the item may describe the process of threading the cable through or around one or more items so that all intended items may be secured using the anchors and cable provided. Again, the cable may be threaded or wrapped around any suitable item that allows for the threading or wrapping of the cable.

Locking the second lock stem to the second lock head may be described as a concluding step in securing one or more items using anchors and a cable. The second end of a cable may be secured to the second lock stem, thus providing a secure anchoring point for the cable and "closing" or securing the cable in relation to the items.

The first lock head and the second lock head can be toggled between a stowed position and an engaged position. As described herein, the lock heads in the anchors may be toggled, or shifted, between a stowed position and an engaged position. While in the stowed position, the anchor may be described as having a low profile with respect to the opening, in that there are minimal components and minimal width added to and visible above the opening. While in the engaged position, the first lock head and the second lock head may be rotated, such that lock port within a lock head may be positioned as is advantageous for inserting a lock stem.

Additional anchors may be provided, which anchors will generally comprise the same structures and components, and have the same functions and relations, as described herein. It may be possible to use as many anchors as can be utilized with corresponding openings for the anchors. Similarly, the use of additional anchors may enable more and varied configurations of cables. Such cables may be described as having three or more ends, as the cable may include branches of cable while still being effectively one cable. Such cables may be described as having a web-like, or net-like, portion while still being effectively one cable as shown in FIG. 11 and may engage third and fourth anchors. Various configurations of cables may be utilized with two or more anchors.

The ends of a cable may be released, or unlocked, from corresponding lock heads, thereby releasing, or unlocking, any items that were secured using anchors and the cable.

The present invention may be embodied in other specific forms without departing from its fundamental functions or essential characteristics. The described embodiments are to be considered in all respects only as illustrative, and not restrictive. All changes which come within the meaning and range of equivalency of the illustrative embodiments are to be embraced within their scope.

What is claimed and desired to be secured by United States Letters Patent is:

1. A method for securing items to the bed of a truck, the method comprising:

providing a first anchor, wherein the first anchor comprises a first top plate configured for resting on top of a side of a truck bed above a first stake pocket in the truck bed, a first tube extending downwardly from the top plate and a first lock head movable in the first tube comprising a first lock port, the first anchor further comprising lock bracket, a first screw disposed in the lock bracket, and a first expansion fastener disposed along the screw;

providing a second anchor, wherein the second anchor comprises a second top plate configured for resting on a top of a side of a truck bed above a second stake pocket in the truck bed, a second tube extending downwardly from the second top plate of the second anchor and a second lock head comprising a second lock port, the second anchor further comprising a second lock bracket, a second screw disposed in the second lock bracket, and a second expansion fastener disposed along the second screw;

inserting the first anchor into a first opening at a top of the first stake pocket along the bed of a truck, the first opening having a rim, and rotating the first screw so that the first expansion fastener moves upwardly toward the first top plate and engages the rim around the first opening of the first stake pocket to hold the first top plate over the opening at the top of the first stake pocket;

inserting the second anchor into a second opening at a top of a second stake pocket along the bed of the truck, the second opening having a rim, and rotating the second screw so that the second expansion fastener moves upwardly toward the second top plate and engages a rim around the second opening of the second stake pocket to hold the second top plate over the opening at the top of the second stake pocket;

providing a cable having a proximate end and a distal end, wherein the proximate end comprises a first lock stem that is capable of being inserted into the first lock port and locked to the first lock head and the distal end comprises a second lock stem that is capable of being inserted into the second lock port and locked to the second lock head;

providing at least one item to be secured;

locking the first lock stem to the first lock head;

using the cable to secure the item; and locking the second lock stem to the second lock head.

2. The method of claim 1, wherein the first lock head and the second lock head can be toggled between a stowed position and an engaged position by pulling against a spring.

3. The method of claim 2, wherein the first lock head and the second lock head can be rotated when in the engaged position.

4. The method of claim 1, wherein the cable is stretchable.

5. The method of claim 3, further comprising:

providing a third anchor, wherein the third anchor comprises a third lock head and the third lock head comprises a third top plate configured for resting on a top of a side of a truck bed above a third stake pocket, a third tube extending downwardly from the third top plate and a third lock head comprising a third lock port, the third anchor further comprising a third lock bracket, a third screw disposed in the third lock bracket, and a third expansion fastener disposed along the screw; and inserting the third anchor into the third stake pocket along the bed of the truck and turning the third screw until the third expansion fastener engages the rim pf the third take pocket and hold the third top plate over the third stake pocket.

6. The method of claim 5, wherein the cable comprises at least three ends and each end comprises a lock stem.

7. The method of claim 6, further comprising:

wherein the third lock head is disposed in communication with a spring for pulling the lock head back into the third tube.

8. A method for securing items, comprising:

providing a first anchor, wherein the first anchor has a first top plate with an opening therein and a first lock head formed by an elongate cylinder and the first lock head comprises a first lock port extending perpendicularly through the elongate cylinder, the first lock head having a size along the lock head which is substantially the same as the opening in the top plate so that the first lock head may extend through the opening in the top plate, the first lock head being disposed in communication with a spring for pulling the first lock head downwardly through the opening;

the first anchor further comprising a screw and an expandable fastener;

inserting the first anchor into a stake pocket on a truck and turning the screw until the expandable fastener engages a rim at the opening of the stake pocket; and inserting an end of a cable into the lock port and locking the end to the first lock head.

9. The method of claim 8, wherein the first lock head is disposed in a cylinder and wherein the method includes using a spring to pull the first lock head downwardly in the cylinder.

10. The method of claim 9, further comprising a second lock head and wherein the first lock head and the second lock head can be rotated when in the engaged position.

11. The method of claim 10, wherein the cable is stretchable.

12. An apparatus comprising:

a body operably containing a top plate sized to cover a top of a stake pocket along the bed of a pick-up truck, the top plate having a cylindrical hole therein, an elongate cylindrical lock head having a lock port extending therethrough and the elongate cylindrical lock head being moveable between a first position wherein the elongate cylindrical lock head extends out through the hole in the top plate so as to expose the lock port and a second position wherein the lock port is maintained below the top plate, and further comprising a lock is disposed in a top of the elongate cylindrical lock head so that the lock remains exposed when elongate cylindrical lock head is in the first position and when the cylindrical lock head is in the second position.

13. The apparatus of claim 12, wherein the elongate cylindrical lock head nests in a cylinder extending downwardly from the top plate and wherein the spring is disposed in communication with the elongate cylindrical lock head to pull the elongate cylindrical lock head into the second position.

14. The apparatus of claim 13, further comprising a lock bracket disposed below the top plate, the lock bracket containing a screw and an expandable fastener which travels up the screw when the screw in toward the top plate when the screw is rotated in one direction such that when the apparatus is disposed in a stake pocket along the bed of a pickup truck the expandable fastener engages a bottom of a rim of the stake pocket and holds the top plate against an opposing side of the rim.

15. The apparatus of claim 13, wherein the lock bracket is mounted to the side of the cylinder extending downwardly from the top plate.

16. The apparatus of claim 13, further comprising a top cover that is removably connectable to the top plate and covers the elongate cylindrical lock head and the screw of the disposed in the lock bracket.

17. The apparatus of claim 12, further comprising a cable core extending downwardly from the elongate cylindrical lock head and a spring mounted along the cable core for pulling the elongate cylindrical lock head into the second position.

18. The apparatus of claim 17, further comprising a cylinder extending downwardly from the top plate, the cylinder a bottom, wherein the cable core extends through a hole in the bottom of the cylinder and wherein the spring is disposed below the bottom of the cylinder along the cable core.

19. The apparatus of claim 14, wherein the screw extends through the top plate and wherein rotating the screw in one direction causes the expandable fastener to expand and engage a structure on an opposing side from the top plate, and rotating the screw in an opposing direction causes the expandable fastener to move downwardly in the lock backet to thereby compress the expandable fastener.

* * * * *